June 14, 1927.
J. G. JOHNSON
1,632,293
STUFFING BOX
Filed June 13, 1925
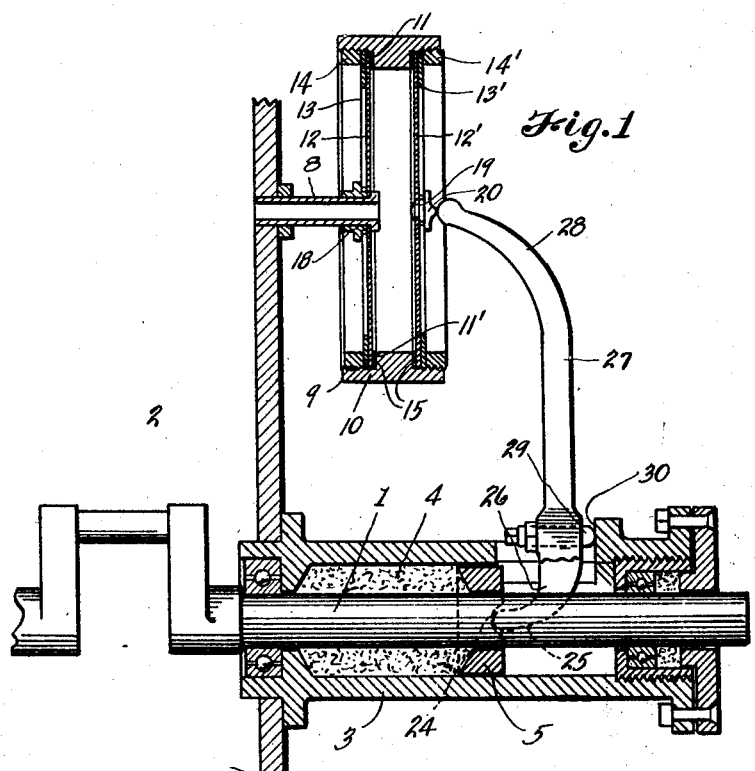
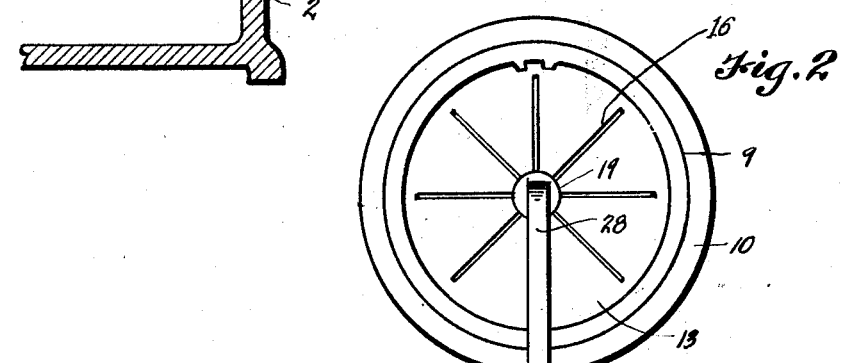
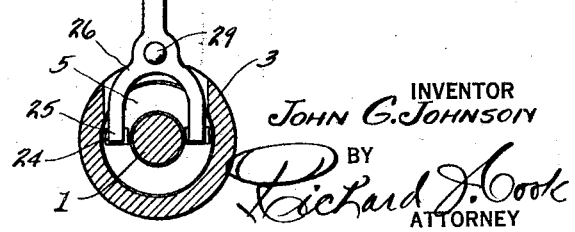
INVENTOR
JOHN G. JOHNSON
BY
Richard J. Cook
ATTORNEY Patented June 14, 1927.

1,632,293

UNITED STATES PATENT OFFICE.

JOHN G. JOHNSON, OF TACOMA, WASHINGTON.

STUFFING BOX.

Application filed June 13, 1925. Serial No. 36,994.

This invention relates to improvements in stuffing boxes and more particularly to stuffing boxes designed for compressors of that character used in ammonia ice making machines; it being the principal object of this invention to provide a stuffing box through which the compressor shaft may operate and to provide means in connection therewith whereby the tightness of the packing material about the shaft is caused to be varied in accordance with the pressure within the compressor.

More specifically, the object of this invention resides in the provision of a stuffing box of the above character having a slidably adjustable gland that is held against the packing material by one end of a pivotally mounted lever which, at its other end, engages with one face of an expandible drum having connection with the interior of the compressor whereby it is caused to expand or contract in accordance with variations of pressure in the compressor so that, through the lever connection, the pressure against the packing material is lessened or increased in accordance with the minimum amount of pressure required to prevent leakage about the shaft.

Other objects reside in the various details of construction and combination of parts hereinafter described and illustrated.

In accomplishing these and other objects, I have provided the improved details of construction, the preferred forms of which are illustrated in the accompanying drawings, wherein—

Figure 1 is a cross sectional view taken through a stuffing box and its automatic control mechanism.

Figure 2 is a face view of the same parts.

Referring more in detail to the drawings—

1 designates what may be the crank shaft of the compressor having a crank case chamber, designated at 2; the compressor being of that character used generally in ammonia ice making machines wherein it is required that there be no leakage and wherein the shaft extends through a stuffing box 3 that contains a packing material of any desirable character, as indicated at 4, that is held within the box by a gland 5 that is fitted slidable on the shaft and within the outer portion of the stuffing box.

Threaded into a wall of the crank case is a short tube 8 which at its outer end supports a drum 9 which is caused to expand and contract in accordance with the internal pressure within the compressor as communicated to the drum through the tube 8. The drum comprises a cylindrical body 10 provided at opposite ends with outwardly facing annular shoulders 11—11' upon which flexible diaphragms 12—12' are seated, and which are held in place by overlying disks 13—13' which in turn, are secured by ring nuts 14—14' threaded into the ends of the cylindrical body tightly against the disks. Gaskets 15 are placed beneath the diaphragm and shoulders 11 to prevent possible leakage.

The disks 13—13' are provided for the purpose of strengthening the diaphragms and in order that they will not interfere with the expansion or contraction of the latter, the disks are each provided with a plurality of radially directed slots 16 extending from the centers of the disks to near their edges, as is shown best in Figure 2. The tube 8 connects with the drum centrally of the diaphragm 12 and has a nut 18 threaded thereonto to overlie the disk 13 about the central opening through which the tube extends and fixed centrally to the diaphragm 13 is a nut 19 having a rounded head portion 20 overlying the adjacent portions of the diaphragm 13'.

Formed in the outer end surface of the gland 5, at opposite sides of the shaft 1, are notches 24 in which the inturned end portions 25 of a yoke 26, formed at the end of an upwardly extended lever 27, are pivotally seated. At its upper end the lever has an inturned portion 28 bearing against the head 20 of the nut 19 and intermediate its ends it has a bolt 29 adjustably threaded thereinto that seats against a shoulder or seat 30 formed in the outer end of the stuffing box.

With the mechanism so constructed and arranged, it will be seen that an increase of pressure in the compressor will cause the diaphragms of the drum to be expanded and since the drum is fixedly mounted, this expansion will move the lever 27 pivotally to press inwardly on gland 5 to thereby more tightly compress the packing material about the shaft. Likewise, as the pressure in the compressor diminishes, the drum will contract and will relieve pressure on the gland accordingly.

This construction prevents leakage through the stuffing box while there is high pressure in the crank case and then reduces the friction against the shaft when the pressure is low.

The bolt 29 in the lever may be adjusted as is necessary to retain the lever properly in place and to obtain the desired pressure against the gland by expansion of the drum.

Having thus described my invention, what I claim as new therein and desire to secure by Letters-Patent, is:

1. In a compressor or the like of the character described, having its driving shaft extended through a wall of the compressor, with a stuffing box encircling the shaft and a packing material within the box as a means of preventing leakage of pressure from the compressor, a gland slidable on the shaft within the box, a drum connected with the compressor casing and adapted to expand and contract in accordance with variations of pressure therein, a pivotally mounted lever bearing at one end against the drum and at its other end against the gland whereby the pressure of the gland against the packing material is caused to vary in accordance with the variation of pressure in the compressor.

2. In a compressor or the like of the character described, having its driving shaft extended through a wall of the compressor, with a stuffing box encircling the shaft and a packing material within the box as a means of preventing leakage of pressure from the compressor, a gland slidable on the shaft within the box, a drum connected with the compressor casing and adapted to expand and contract in accordance with variations of pressure therein, a lever having bearing contact at its ends respectively with the drum and gland and having an adjustable fulcrum intermediate its ends by means of which the pressure of the gland may be adjusted against the packing material and through which expansion of the drum causes an increase of pressure against the gland and packing material.

3. In a compressor or the like of the character described, having its driving shaft extended through a wall of the compressor, with a stuffing box encircling the shaft and a packing material within the box as a means of preventing leakage of pressure from the compressor, a gland slidable on the shaft within the box having notches in its outer face at opposite sides of the shaft, a drum supported from the compressor and having connection with the compressor casing through which it is caused to expand and contract in accordance with variations of pressure therein, a lever having an adjustable bearing member intermediate its ends adapted to pivotally engage the stuffing box wall and having a yoke at one end embracing the shaft with its ends seated pivotally in said notches and seated at its other end against said drum and whereby expansion or contraction of the drum increases or decreases the pressure of the gland against the packing material accordingly.

Signed at Tacoma, Pierce County, Washington, this 28th day of May, 1925.

JOHN G. JOHNSON.